United States Patent
Risicato et al.

(10) Patent No.: US 11,383,406 B2
(45) Date of Patent: Jul. 12, 2022

(54) FIBROUS STRUCTURE AND 3D PREFORM FOR A COMPOSITE PART

(71) Applicant: PORCHER INDUSTRIES, Badinieres (FR)

(72) Inventors: Jean Vincent Risicato, Beaucroissant (FR); Patrick Varaniac, Tramole (FR); Hubert Perrin, Flacheres (FR); William Dussenne, Les Abrets (FR)

(73) Assignee: PORCHER INDUSTRIES, Badinieres (FR)

( * ) Notice: Subject to any disclaimer, the term of this patent is extended or adjusted under 35 U.S.C. 154(b) by 381 days.

(21) Appl. No.: 16/329,521

(22) PCT Filed: Sep. 1, 2017

(86) PCT No.: PCT/EP2017/071945
§ 371 (c)(1),
(2) Date: Feb. 28, 2019

(87) PCT Pub. No.: WO2018/041990
PCT Pub. Date: Mar. 8, 2018

(65) Prior Publication Data
US 2019/0255738 A1    Aug. 22, 2019

(30) Foreign Application Priority Data

Sep. 2, 2016 (FR) ...................... 1658181

(51) Int. Cl.
*B29B 11/16* (2006.01)
*D03D 25/00* (2006.01)
(Continued)

(52) U.S. Cl.
CPC ............ *B29B 11/16* (2013.01); *D03D 25/005* (2013.01); *B29K 2307/04* (2013.01); *B32B 5/06* (2013.01); *B32B 7/12* (2013.01)

(58) Field of Classification Search
USPC ..... 139/383 R; 442/205, 214, 216, 217, 218, 442/203, 189, 239
See application file for complete search history.

(56) References Cited

U.S. PATENT DOCUMENTS 6,368,989 B1    4/2002  Pascual et al.
6,418,973 B1 *  7/2002  Cox .................. C04B 35/62873
                                              139/383 R
(Continued)

FOREIGN PATENT DOCUMENTS

CN       1345196       4/2002
DE    102014213320    11/2015
(Continued)

OTHER PUBLICATIONS

Campbell F C ED—Campbell Flake C: "Manufacturing processes for advanced composites", Jan. 1, 2004 (Jan. 1, 2004), Manufacturing Processes for Advanced Composites, Els Ev I Er Advanced Technology, Oxford, GB, pp. 304-356, XP002580602, ISBN: 978-1-85617-415-2 paragraphs [09.2], [09.3], [09.4], [9.13] figure 4.

(Continued)

*Primary Examiner* — Lynda Salvatore
(74) *Attorney, Agent, or Firm* — B. Aaron Schulman, Esq.; Stites & Harbison, PLLC (57) ABSTRACT

The preform made of a 3D fibrous structure comprises at least 3 layers (1, 2) of weft yarns and/or warp yarns, the structure being woven as a single part by multilayer weaving between a plurality of layers of warp yarns and a plurality of layers of weft yarns. It comprises a predetermined distribution of points of intersection of warp yarn and weft yarn that are bonded by polymer. The polymer represents a mass of less than or equal to 10%. The preform comprises at least one thermoformed portion in which the warp yarns and the weft yarns are bonded at the intersections thereof by poly- (Continued)

mer where at least one of the warp and/or weft yarns bears polymer.

25 Claims, 3 Drawing Sheets

(51) Int. Cl.
    *B29K 307/04*     (2006.01)
    *B32B 5/06*     (2006.01)
    *B32B 7/12*     (2006.01)

(56) References Cited

U.S. PATENT DOCUMENTS

| 8,505,588 | B2 | 8/2013 | Coupe et al. |
| 8,685,868 | B2 | 4/2014 | Bouillon et al. |
| 9,451,074 | B2 | 9/2016 | Delbary et al. |
| 10,612,186 | B2 * | 4/2020 | Fouquet ............ B29D 99/0089 |
| 2014/0175709 | A1 | 6/2014 | Blackburn et al. |

FOREIGN PATENT DOCUMENTS

| EP | 0424216 | 4/1991 |
| FR | 2902503 | 12/2007 |

OTHER PUBLICATIONS

International Search Report for PCT/EP2017/071945, dated Nov. 21, 2017.
Written Opinion of the International Searching Authority for PCT/EP2017/071945, dated Nov. 21, 2017.
Preliminary Search Report for FR1658181, dated Jun. 12, 2017.

* cited by examiner

FIBROUS STRUCTURE AND 3D PREFORM FOR A COMPOSITE PART

The present invention relates to a fibrous structure and a 3D (3-dimensions) preform obtained from this fibrous structure, and that is intended to form the base of a composite part, in particular for high-technology industries such as aeronautics, aerospace and automobiles. It also relates to a manufacturing method.

The composite materials with textile or fibrous reinforcement comprise at least two constituents: the matrix and the reinforcement. The matrix, which encapsulates and stiffens the reinforcement, makes it possible to transmit the mechanical stresses via their interface. The matrix may also be used to protect the fibrous material from aggressions related to the application environment (chemical, thermal, UV, etc.). It may be organic or not. Organic matrices separate into two families, thermosetting (TS) and thermoplastic (TP).

The second constituent is the reinforcement which must provide the mechanical properties of the final material by absorbing the stresses transmitted by the matrix. The materials most used in composite reinforcement applications are glass, aramid and carbon. There are several families of fibrous materials for the reinforcement of composites: namely, pre-impregnated products which carry the quantity of resin required to obtain the composite part, the co-mixes which combine reinforcing fibers and resin fibers, and the products we are interested in here.

The production of a composite material must therefore involve the combination and shaping of the reinforcement and the matrix. Among the production methods used for composites, the Liquid Composite Molding (LCM) resin transfer molding methods offer excellent potential for mass production. Closed mold injection resin infiltration and open mold infusion are the two major families that make up the range of LCM methods. In the "closed mold" production method, the fibrous reinforcement is placed in a mold that remains closed throughout the entire composite production method. This is the RTM method and its derivatives. The "open mold" is specific to half-mold or die technologies: namely, contact molding, filament winding, pre-impregnated coating or pultrusion.

In the first family, we find Resin Transfer Molding (RTM), Resin Transfer Molding Light (RTM-Light), Vacuum Assisted Resin Transfer Molding (VARTM) and Compression Resin Transfer Molding (CRTM). RTM and its derivatives use gravity, piston displacement or pressure differential created by a pump, to "push" the resin into the cavity via the injection port. We speak of resin infiltration. The dry reinforcement may first be shaped during a preforming step by spraying a small quantity of resin, wherein it is then placed in a closed mold into which a liquid resin is injected at one or more points by applying a pressure gradient. Then, the resin (thermoplastic or thermosetting) cross-links or cures in the mold with the rise in temperature, to form the matrix.

In the second family of methods, the cavity of the mold is evacuated and the resin is infused into the part under the effect of atmospheric pressure (Vacuum Assisted Resin Infusion—VARI). Infusion may also be assisted by a network of FAST Remotely Actuated Channeling (FASTRAC), through the use of a Liquid Resin Infusion (LRI) medium, often referred to as SCRIMP (Seemann Composites Resin Infusion Molding Method) in the nautical field and by the infusion of resin disposed in films sandwiched between the layers of the reinforcement (Resin Film Infusion—RFI). We speak of resin infusion.

Woven textile structures suffer from a small thickness compared with the dimensions of the part to be produced. Therefore, layers had to be stacked on top of each other. Interlock structures were developed to link these layers together. Then textile structures having the thickness of the final part were directly developed, wherein the structure was woven as one part by multilayer weaving between a plurality of warp yarn layers and a plurality of weft yarn layers.

EP 424 216 describes the production of a three-dimensional material from yarns previously associated with a thermoplastic resin. Either the yarns are associated with the resin by an intimate mixture in the reinforcing resin fiber yarns present in the form of fibers, or by coating reinforcing yarns with a resin sheath. The 3D fabric is made with 60% glass and 40% PEEK composite yarns, wherein the fabric comprises all the resin needed to consolidate the part. This document therefore relates to pre-impregnated products, and not to the use of dry reinforcements according to the invention.

On the other hand, WO 2006/136755, WO 2013/088035 and FR 2902503 describe the production of composite material parts by three-dimensional weaving from warp and weft yarns, which are subsequently densified by a matrix resin transferred, injected or infiltrated into the fibrous structure. FR 2 939 153 describes the production of a fibrous structure with a changing thickness by three-dimensional weaving.

A variety of three-dimensional (3D) fibrous structures that may be used to form preforms that will then be consolidated by RTM injection or infusion to produce a consolidated composite part are therefore known. However, consolidated composite parts often have shapes that are not flat and may even have complex shapes, with parts that are curved or in different planes, and/or have areas of different thicknesses. Sometimes also, it is necessary to deploy the 3D fibrous structure before placing it in the mold. A fibrous structure is also likely to settle upon itself. This results in difficulties of implementation or deformation of the deployed form of the preform. The pressure applied to penetrate the resin may cause slippage between yarn layers, or structural deformations that adversely affect the mechanical performance of the final part.

A major difficulty is that any solution to overcome these drawbacks should not interfere with the introduction of the resin into the core of the preform during densification in the mold to form the consolidated composite part, nor cause the uncontrolled movement of portions or layers of the reinforcement.

This problem of handling preforms, particularly of large thickness or 3D in form, or of maintaining the structure upstream of the positioning in the mold and during the injection is very real. The solutions proposed so far have not proved sufficiently effective, flexible or applicable regardless of the material of the preform. DE 2014 2014 213320 describes how the preforms may be bonded by a binder which is sprayed in pulverulent form onto the preform, but this solution only provides the beginning of a solution for planar faces, whereas it does not allow for vertical faces, for example. It has therefore been proposed in the said document to perform electrostatic powdering of the entire preform formed of carbon fibers that are inherently conductive. However, this method is not applicable to non-conductive fibers, such as glass. In addition, it lacks flexibility and adaptability, insofar as the entire structure will be potentially subjected to electrostatic powdering, which does not allow the definition of areas not requiring, or not receiving, the binder. In addition, if all the conductive fibers are liable to be subjected to a potential difference, this does not mean that binder powder will be able to reach the deep layers of yarn in sufficient quantities, nor that a metered distribution of the binder is possible throughout the structure, or in selected portions.

The object of the present invention is to provide a three-dimensional (3D) fibrous preform of good performance, in particular by being stabilized, easily displaceable and manipulable, and offering a permeability that is suitable for the uniform penetration to the core of a polymer intended to form a composite part with the preform by limiting or eliminating the movement of yarns or fibers under the effect of the penetration of the polymer.

It also aims to achieve a multilayer fibrous structure that is planar and may be expanded to form a complex 3D preform.

It also aims to provide a method of producing such a preform to solve the problems of previous methods such as electrostatic powdering. In particular, the proposed method must be applicable irrespective of the nature of the yarn composing the preform, and/or allow the definition of areas or layers of yarn to receive the binder and areas or layers of yarn not to receive the binder. The method must also be able to control the distribution or dosage of binder according to the layers or areas of the structure. This method also aims to allow optimal deployment of the preform and the fixation of its deployed configuration, in order to give the preform thus obtained, the properties specified for the aforementioned objectives.

The object of the invention is thus a preform with a 3D fibrous structure comprising at least 3 layers of weft yarns and/or at least 3 layers of warp yarns, wherein the structure is woven as a single part by multilayer weaving between the plurality of warp yarn layers and the plurality of weft yarn layers. The entirety, or a determined fraction, of the warp yarns and/or the weft yarns bear the heat-sensitive polymer on the surface. This polymer represents a weight of less than or equal to about 10%, preferably about 1 to about 7%, more preferably about 1 to about 5%, by weight based on the total weight of the preform. The distribution of the polymer-bearing yarns and therefore the distribution of the intersection points bound by the polymer, are predetermined and not random.

It is therefore possible to define the preform as comprising a predetermined distribution of the intersection points of warp yarn and weft yarn bonded by polymer. In particular with yarns uniformly coated with the polymer, there is a distribution of bonded points which may be 100%, or close to 100%, when all the warp yarns and/or weft yarns are coated with the polymer, or which may be less than 100%, but perfectly defined with respect to a predetermined distribution of the polymer-bearing yarn. Alternatively, a distribution of less than 100% could be provided, for example 95%, 90% or 80%. One could even consider a distribution lower than 40% for some applications.

The preform may thus also be defined as comprising a textile structure whose weaving has been carried out using warp yarns and/or weft yarns bearing the thermosensitive polymer (yarns pre-coated with this polymer) on their surface, wherein the transition to the preform is achieved by thermoformation at a temperature above the softening point of the polymer, followed by cooling, whereby the warp yarns and weft yarns are bonded at their intersection by polymer where at least one of the warp yarns and/or weft yarns carry polymer.

The preform therefore comprises at least one portion in which the warp yarn and the weft yarn are linked to their intersections by the polymer where at least one of the warp yarn and/or weft yarn carry polymer. The polymer is in the cured state. The connection at the points of intersection is obtained by softening, then curing the polymer through suitable heating. In one embodiment, the preform comprises at least one portion in which the warp yarns and weft yarns are bonded at their intersections by polymer, and at least one portion in which the warp yarns and the weft yarns are not linked at their intersections by polymer.

The polymer present on the yarns is fixed, if it is thermosetting, or solidified if it is thermoplastic. It may be below its glass transition temperature. Whether thermosetting or thermoplastic, the polymer has a softening temperature, which may correspond to its Tg. The passing of this temperature will lead to a reversible softening allowing, on the one hand, the bonding of the coated yarns (at least one of the warp and weft yarns in contact) at their points of intersection, and, on the other hand, as we will see, the deployment of the structure in its form of "preform". Cooling below this temperature will set the preform, ready to be impregnated with resin, and easily manipulated.

The preform may be flat, curved, in the form of at least two portions forming an angle between them, or it may have portions of varying thickness as described in FR 2 939 153.

The preform may also have a form resulting from the deployment of a fibrous multilayer fibrous structure resulting from weaving, wherein this structure is, by definition, flat and having the thickness resulting from this weaving. This preform may thus comprise a hollow or tubular part and/or have at least two planes, for example 2, 3, 4, 5, etc. forming any angle between them, for example a primary structure (in the plane of the original fibrous structure) to which 1, 2, 3, 4, 5, etc. secondary portions or branches are connected. As described below, at the origin in the fibrous structure, the planes of the secondary parts are preferentially aligned and in the same direction as the planes of the primary structure, wherein the secondary portions are so deployed that their planes change their orientation and are inclined with respect to the primary structure.

The object of the invention is also this woven planar multilayer fibrous structure.

In one embodiment, the fibrous structure comprises at least 3 layers of weft yarns and/or warp yarns. The structure is woven as one part by multilayer weaving between the warp and weft layers, so that the fibrous structure is integrally woven (i.e. there are no two layers of warp yarns or two adjacent layers of weft yarns that are not bound by the complementary yarn). The fibrous structure comprises warp yarns and/or weft yarns bearing a thermosensitive polymer on their surface. All, or only a fraction, of the warp yarns and/or weft yarns bear the thermosensitive polymer on their surface. This polymer represents a weight of less than, or equal to, about 10%, preferably about 1 to about 7%, more preferably about 1 to about 5%, by weight based on the total weight of the preform. The intersections between the yarns are "free", in the sense that the thermosensitive polymer has not been activated. The distribution of the yarn bearing the polymer and therefore the distribution of the intersection points concerned by the polymer are predetermined and not random.

It is therefore possible to define the textile structure as comprising a predetermined distribution of intersection points of warp yarns and weft yarns coated with polymer. In particular, in the case of yarns uniformly coated with the polymer, there is a distribution of "with polymer" intersection points of 100% or close to 100% when all the warp yarns and/or weft yarns are coated with the polymer, or a distribution that may be less than 100%, however perfectly defined with respect to a predetermined distribution of the polymer-coated yarns.

Such a form may be used to produce a preform that is flat, curved, or has at least two planes at an angle to each other.

In another embodiment, the fibrous structure is able to be deployed in the form of a nonplanar "preform" referred to as "complex", wherein it is then set by thermoforming in this non-planar form. This fibrous structure comprises at least 3 layers of weft yarns and/or warp yarns. The structure is woven as one part by multilayer weaving between a plurality of warp yarn layers and a plurality of weft yarn layers. Weaving is performed using a plurality of warp yarns and/or weft yarns bearing a heat-sensitive polymer on the surface. This polymer represents a weight of less than, or equal to, 10%, preferably from about 1 to about 7%, more preferably from about 1 to about 5%, by weight based on the total weight of the fibrous structure. In this embodiment, the fibrous structure comprises at least one debonding in the plane between two layers of warp yarns or between two layers of weft yarns. Debonding means that two layers of consecutive warp yarns or weft yarns are not bonded together on a certain surface, but are linked where the debonding ends. Thanks to this debonding, the two separate portions may be spaced apart from each other, in the context of the deployment of the preform.

In one embodiment, the fibrous structure comprises a debonding that extends in the plane of the structure from one lateral edge to the opposite lateral edge, and interrupted at a distance from each of the two other lateral edges orthogonal to the previous ones. Deployment of such a structure makes it possible to obtain a hollow or tubular preform.

In one embodiment, the fibrous structure comprises a debonding that extends in the plane of the structure from one lateral edge to the opposite lateral edge and to an orthogonal lateral edge, but is interrupted at a distance from the edge opposite to the previous edge. Deployment of such a structure makes it possible to obtain a preform having at least two planes forming any angle between them, for example a primary structure to which is connected 1, 2, 3, 4, 5, etc. secondary portions or branches.

These two embodiments may be combined.

According to a variation of these various embodiments, the fibrous structure comprises at least one portion in which the warp yarns and/or weft yarns are coated with polymer, and at least one portion in which the warp yarns and the weft yarns are not coated.

According to a variation of these various embodiments, the fibrous structure has a homogeneous thickness over its entire extent, wherein this thickness depends on various factors present simultaneously, comprising in particular the number of layers of warp yarns, the number of layers of weft yarns, the type of weaving, the count of the warp yarns, the count of the weft yarns.

According to another variation of these various embodiments, the fibrous structure has a nonhomogeneous thickness over its entire extent, wherein the variation in thickness is related to the number of layers of warp yarns, the number of layers of weft yarns, the type of weaving, the count of the warp yarns, the count of the weft yarns, and variations of these criteria according to the zones of the structure in order to obtain at least two portions of different thicknesses.

The invention also relates to a method of producing the fibrous structure. The method comprises weaving a fibrous structure as one part by multilayer weaving between a plurality of warp yarn layers and a plurality of weft yarn layers. The weaving is performed using a plurality of warp yarns and/or weft yarns bearing a thermosensitive polymer (pre-coated yarns) on their surface. This polymer represents a weight of less than, or equal to, about 10%, preferably about 1 to about 7%, more preferably about 1 to about 5%, by weight based on the total weight of the preform. The polymer, in particular thermoplastic or thermosetting polymer, is thermo- or heat-sensitive, which means that it may be softened by a temperature rise that is appropriate to reach the softening temperature of the polymer, or a little above it.

In one embodiment, a fibrous structure of uniform thickness is produced over its entire extent, in particular by playing on the number of layers of warp yarns, the number of layers of weft yarns, the type of weaving, the count of warp yarns and/or the count of the weft yarns.

In one embodiment, a fibrous structure of nonhomogeneous thickness is produced throughout its entire extent. The variation in thickness is introduced by playing, in particular, on the number of layers of warp yarns, the number of layers of weft yarns, the type of weaving, the count of the warp yarns and/or the count of the weft yarns. A structure having at least two portions of different thicknesses is thus produced.

In one embodiment, a fibrous structure is produced having at least one debonding in the plane between two layers of warp yarns or between two layers of weft yarns. This debonding is introduced by not binding two consecutive layers of warp or weft yarns on a certain surface. In the case where these are two layers of weft yarns that are not bonded with warp yarns, the weaving method outside this debonding zone leads to bonding these layers of weft yarns together through warp yarns. In the case where these are two layers of warp yarns that are not bonded by weft yarns, the weaving method outside this debonding zone leads to the bonding of these layers of warp yarns together by weft yarns. Thanks to this debonding, the two separate portions may be spaced apart from each other, while being linked together at the base of the debonding, as part of the deployment of the preform.

In one embodiment, a fibrous structure is produced comprising a debonding extending in the plane of the structure from one lateral edge to the opposite lateral edge, and interrupted at a distance from each of the other two lateral edges orthogonal to the previous ones. Deployment of such a structure makes it possible to obtain a hollow preform delimiting, for example, one or more parallelepipedal or tubular spaces.

In one embodiment, a fibrous structure is produced comprising a debonding extending in the plane of the structure from one lateral edge to the opposite lateral edge, and to an orthogonal lateral edge, but interrupted at a distance from the edge opposite to the previous one. Deployment of such a structure makes it possible to obtain a preform having at least two planes forming any angle between them, for example a primary structure to which is connected 1, 2, 3, 4, 5, etc. lateral portions or branches.

The invention also relates to a method for producing a preform according to the invention. In this method, we start from a fibrous structure as described herein, or we first produce a fibrous structure according to the method which is described here.

In a following step, the flat or deployed fibrous structure is heated to the softening temperature of the polymer, or a little above it. Then, the temperature is lowered below this softening point and the curing of the polymer is obtained, as a result of which we obtain the connection of the yarns to each other at the contact points where this polymer is present. The polymer is advantageously chosen to have a softening point greater than room temperature (20-25° C.).

In one embodiment, the fibrous structure is placed in an open or closed mold during this heating operation and then cooled. The mold is in the form of the preform to which the fibrous structure must lead.

In one embodiment, when placed in the mold, the fibrous structure must be formed or deployed to give it the shape of the mold or preform. This deployment may be carried out in the case of a fibrous structure comprising a debonding, or simply by bending or folding a fibrous structure.

The "stiffened" preform may then be placed in the closed or open mold for the infiltration or infusion of the resin that is intended to form the matrix of the composite. It is also said that the resin or matrix "densifies" the composite part.

The invention also relates to this composite material part comprising a preform according to the invention, densified by the matrix.

The invention also relates to a stiffener or frame, such as those used in the aeronautical, aerospace and automotive industries, in the form of, or comprising, a part according to the invention. These composite parts are used to stiffen any type of fairings, fuselages, nacelles and other bodies.

Unless otherwise indicated, the following features apply to the different objects of the invention.

The yarns bearing on their surface, or being impregnated with, a thermosensitive polymer are in this form before weaving, they are advantageously associated with this polymer over their entire length, including at the interface with the yarns they cross and/or with the parallel yarns that are in contact with them. As will be seen below, depending on how the polymer is deposited on the surface of the yarns, the polymer may form a continuous coating or an irregular or discontinuous coating.

When yarns without polymer are integrated into the structure, they are entirely free of this polymer over their entire length, unlike what could happen in the case of polymer being sprayed locally on the structure, and they may simply be in contact with the polymer borne by a yarn which crosses them at the point of intersection with this yarn.

In one embodiment, the yarns may comprise polymer within them as well, i.e. the polymer is inserted into the mass of the yarn, in contact with, and between the filaments that make it up. In this case, this so-called to-the-core impregnation is preferably continued over the entire length of the yarn.

The preform is easily movable and manipulable, and may be easily placed in a mold.

It does not collapse upon itself as the same 3D structure free of polymer at selected crossover points would. This maintenance of the preform is ensured either by the use of polymer bearing warp and/or weft yarns throughout the preform, or by the use of polymer bearing warp and/or weft yarns judiciously placed where necessary. In addition, before forming the preform, the 3D woven structure may be bent, folded and/or unfolded, and then the fixing of the preform from this formed structure may be achieved by appropriate heating and then cooling. This may be carried out optionally in a mold or any other type of adapted tool.

After weaving, therefore, the fibrous structure is deployed or is kept unfolded and subjected to this heating, making it possible to thermoform the structure or the portion(s) thereof comprising yarns bearing the polymer on their surface, i.e. where one has decided to have polymer. This makes it possible to obtain a preform with the desired optimal configuration in a more reliable and reproducible manner than with an electrostatically powdered structure, all the more so if the structure or preform has a large thickness or is in 3D.

Another advantage is the guarantee of the presence of the binder at the points of intersection (which can not be guaranteed by post-weaving powdering), which also contributes to the generation of an optimal preform. Heating may be achieved by any suitable heating means. An interesting mode is infra-red heating. By definition, this thermoforming is not accompanied by the application of pressure on the fibrous structure. Nevertheless, it is preferable to hold the preform with a tool for clamping the structure.

In one embodiment, at least one of the edges of the fibrous structure comprises polymer bearing warp and/or weft yarns.

In one embodiment, at least one of the edges of the fibrous structure comprises warp and/or weft yarns carrying polymer, wherein the preform is characterized in that this at least one edge comprises a weld formed by heating, or cutting and heating the yarns. The heating may be carried out as specified above. The cutting plus heating may be carried out in one step by means of a cutting tool heated in any known manner, for example by infra-red.

The polymer in contact with certain warp and/or weft yarns may be chosen from thermoplastic and thermosetting polymers (including copolymers). It may be the same or different from the polymer which will then be injected or infused. There may be mentioned in particular: polyamides (PA), copolyamides (CoPA), polyamides-block ether or ester (PEBAX, PEBA), polyphthalamides (PPA), polyesters (especially polyethylene terephthalate -PET-, polybutylene terephthalate -PBT-), copolyesters (CoPE), thermoplastic polyurethanes (TPU), polyacetals (POM, . . . ), polyolefins (especially PP, HDPE, LDPE, LLDPE), polyethersulfones (PES), polysulfones (PSU, . . . ), polyphenylenesulfones (PPSU, . . . ); polymers of the family of PAEK polyaryletherketones including polyetheretherketones (PEEK) and polyetherketoneketone (PEKK); poly (phenylene sulfide) (PPS), polyetherimides (PEI), thermoplastic polyimides, liquid crystal polymers (LCP), phenoxys, block copolymers such as styrene-butadiene-methylmethacrylate (SBM) copolymers, methylmethacrylate-butyl-methylmethacrylate acrylate (MMA) copolymers and their mixtures, epoxides, bismaleimide, phenolic polymers.

More particularly, the polymer may be selected from the following: PA6, PA12, PA6.6, PA6.10, PA6.12, or a polyepoxide with a low softening point, or a mixture of at least two of them.

To transition from the fibrous structure to the preform, the fibrous structure is thermoformed at a temperature above the softening point of the polymer followed by cooling, whereby the warp yarns and the weft yarns are bonded to their intersections by polymer where at least one of the warp and/or weft yarns bears the polymer.

In one embodiment, the warp yarns and/or weft yarns engaged in the weave bear the polymer in at least a portion of the fibrous structure. In other words, only one or more regions of the structure comprise polymer. In this case, the preform will comprise at least one thermoformed part and part without polymer and non-thermoformed.

In one embodiment, it is possible for all of the warp yarns engaged in the weaving to bear the polymer and for all or part, preferably all, of the preform to be thermoformed.

In one embodiment, it is possible for all of the weft yarns engaged in the weaving to carry the polymer and for all or part, preferably all, of the preform to be thermoformed.

In one embodiment, it is also possible for all of the warp yarns and all of the weft yarns engaged in the weaving to bear the polymer and all or part, preferably all, of the preform to be thermoformed.

However, thanks to the use of Jacquard technology and, in particular, looms in which the warp yarns may be individually controlled in height, it is possible to use warp and/or weft yarns bearing polymer or impregnated with polymer to weave portions of the structure that require thermoforming, while other portions that do not require this will be woven with warp and/or weft yarns without polymer. All the combinations may be achieved. In addition, this type of loom also makes it possible to vary the weaving patterns and to vary the thicknesses.

In one embodiment, the fiber volume ratio (FVR) is from about 30% to about 80%. This percentage represents the volume of fiber in a given composite volume. Preferably, this fiber volume ratio is measured once the composite part, including the preform, has been injected and consolidated. This ratio takes into account the polymer borne by some of the yarns or all of the yarns, so that one may also speak of fiber+polymer volume ratio. The use of yarns bearing the polymer has the advantage of making it possible to ensure that such a volume ratio is obtained in all parts of the preform (whereas post-weave powdering will lead to irregularities in the polymer content and variability in the volume ratio), making it possible to ensure optimally the uniform penetration of the core of the preform by a polymer in a subsequent step, for example through injection or infusion.

Advantageously, thanks to the reduced content and careful positioning of the yarn bearing the polymer, the preform has a permeability that is capable of permitting the uniform penetration of the core of the preform, of a polymer in a subsequent step, for example through injection or infusion.

In one embodiment, a plurality of warp yarns and/or weft yarns bears a powder-deposited polymer, for example gravitational powdering or electrostatic powdering, extrusion, impregnation, or thermal spray coating. The polymer deposit is made on the yarns before weaving. Advantageously, heat treatment may be carried out to fix the polymer on the yarns, which allows the polymer to remain in place on the yarns during weaving. The heat treatment is then preferably adapted so that the flexibility of the yarns is retained to avoid degrading the weaving operation.

The number of warp layers is not necessarily the same as the number of weft layers (e.g. 7 warp layers and 8 weft layers). In one embodiment, the fibrous structure and therefore the preform comprises from 3 to 100, preferably from 3 to 50, layers of warp yarns and/or weft yarns. In one embodiment, the structure and the preform are characterized by a maximum thickness of about 100 mm. This thickness may, in particular, be between about 1 and about 100 mm, typically between about 1 and about 20 mm. According to the invention, the preform may have parts of different thicknesses.

The cohesion of the preform with the polymer may be obtained in a predetermined and homogeneous manner right to the core of this thickness.

The yarns may be of organic or inorganic material. As organic material, mention may be made, for example, of polypropylene (PP), viscose, polyamides, in particular PA66, polyethylene terephthalate (PET), polyvinyl alcohols (PVA), polyethylenes (PE), para-aramids, poly (p-phenylene-2,6-benzobisoxazole) (PBO). As inorganic material, mention may be made, for example, of steel, carbon, silica, glass (S,E,R . . . ), alumina oxides.

In one embodiment, it is carbon yarns.

The constituent filaments of the yarns are preferably continuous. The filaments used generally have a substantially circular cross-section (round filaments) or, preferably, substantially parallelepipedal or elliptical (flat filaments).

Any type of carbon yarn may be used. Preferably, it is possible to use High Resistance (HR) yarns whose tensile modulus is between 220 and 241 GPa and whose modulus at break is between 2450 and 4830 MPa, of Intermediate Modulus (IM) yarns whose modulus at break is between 242 and 300 GPa and whose modulus at break is between 3450 and 6400 Mpa, and High Module (HM) yarns whose tensile modulus is between 345 and 600 GPa and whose modulus at break is between 3450 and 5520 MPa (see ASM Handbook, ISBN 0-87170-703-9, ASM International 2001).

In one embodiment, the fibrous structure is formed by Jacquard weaving.

Any type of weaving may be used, for example satin, twill, taffeta. We may also integrate interlock weaving.

The invention makes it possible to produce and dispose of preforms having the following advantageous characteristics:
preforms with exact dimensions/geometries ready to be arranged in the liquid resin infusion or infiltration mold;
dry preforms, non-tacky, thermoformable, without fraying, whose cutting is tight to dimensions useful for molding;
dense preforms made of yarns with a resin present at the core whose location is controlled;
preform containing a level of thermoplastic or thermosetting resin but still heat-sensitive (with a softening point).

This offers the following advantages at the time of resin infusion molding, and results in an increase in productivity:
woven preform that avoids manual stacking in the preform mold;
woven preform that avoids uncontrolled sliding of the folds under the pressure of forming or infusion: control of the mechanical characteristics and the rate of rejection;
woven preform that avoids the use of weld patches or manual welding of folds between them;
presence of resin at the core of a dense part made of fibers that avoids porosities (<1%);
woven preform which avoids the use of a filling gusset;
woven preform that eliminates the manual impregnation step with a brush or spray, in particular of each unit layer of fibrous reinforcement, as well as bonds such as sewing or knitting, to better control the transverse permeability of the material and microfissurations;
woven preform which presents substantial regularity and facilitates the implementation;
the resin serves to hold the preform, which is useful in molds with a double radius of curvature or other molds of complex shape.

The invention will now be described in more detail with the aid of embodiments chosen by way of a nonlimiting example and with reference to the appended drawing in which.

Woven reinforcements are among the most used in composite applications. They are reinforcements with two privileged orientations in the plane. They are obtained by the intercrossing of a network of warp yarns (production direction) and a network of weft yarns (transverse direction) on a loom. The network of warp yarns, conditioned on a beam, forms a sheet. The sheet leaves the beam and passes through specific elements (tensioning, catch yarn device . . . ). To achieve this interweaving we just open the sheet to form the shed. The opening of this shed is effected by taking the yarns from the plane of the sheet by the top or the bottom. Once the shed is formed, we insert the weft yarn. This yarn will then be tamped at the point of crossing. After tamping, a new shed is created and traps the inserted yarn just preceding.

The heddles may be controled by a so-called dobby mechanism or a "Jacquard" mechanism. In a dobby mechanism, frames each include several heddles. The number of frames allows the weaving to be made more or less complex but there will always be a repetition of the pattern. The "Jacquard" mechanism makes it possible to select each heddle independently, which makes it possible to produce complex and irregular fabrics.

The insertion is generally performed using three families of tools:

lance: rigid, flexible or telescopic,
projectile or shuttle (onboard supply of yarn),
fluid: air jet or water jet (hydrophobic fibers).

After insertion, the yarn is tamped with a comb at the point of crossing. The comb may sometimes be contoured to guide a projectile or generate a channel for the fluid. The tamping step constrains the yarn by crushing it in a substantial manner.

It is possible to create many weavings that result from the choice of sheds and successive insertions. The basic weaving is canvas, twill or satin.

EXAMPLE 1

Figure 1:
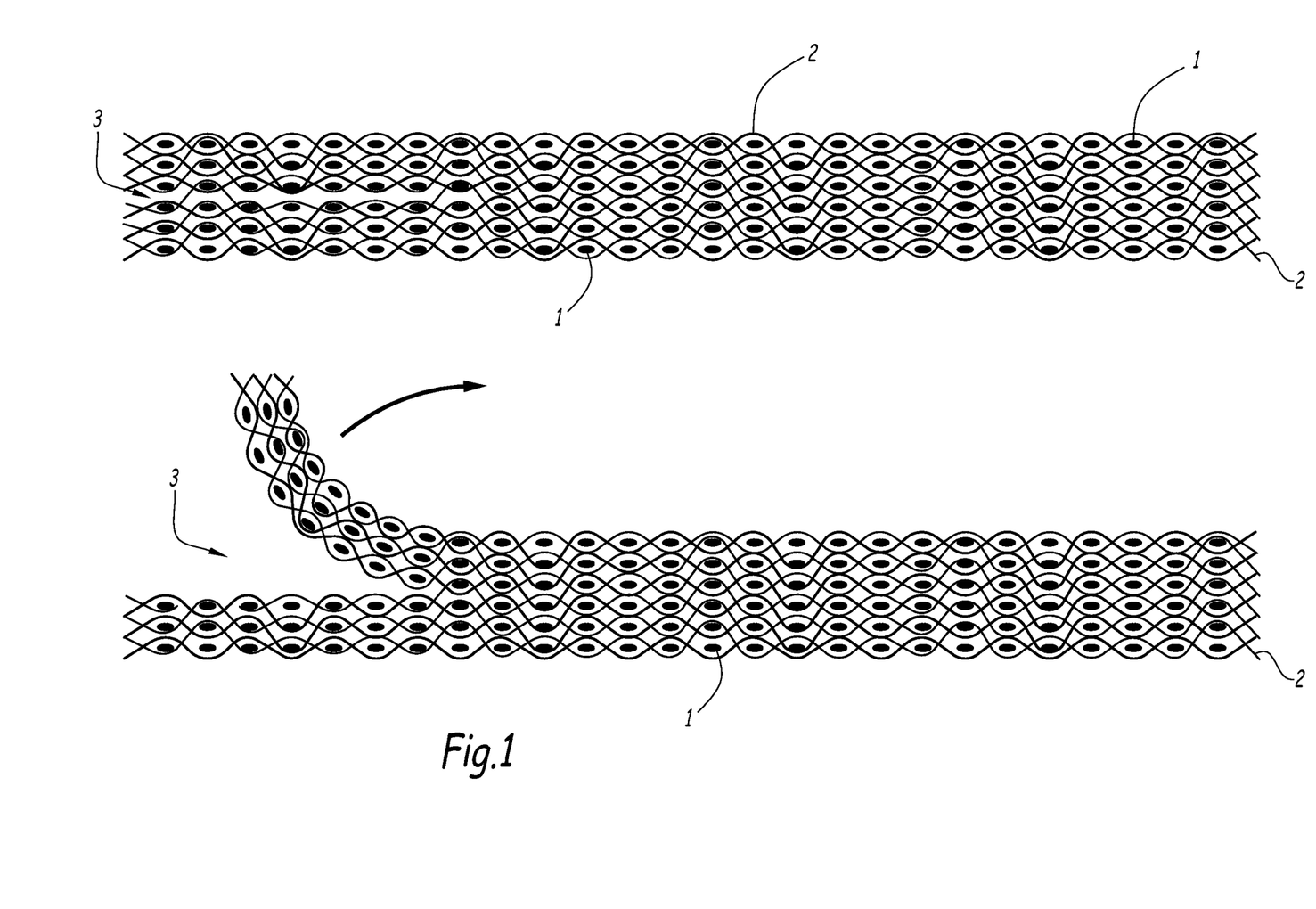
FIG. 1 shows a schematic view of a woven structure according to the invention for forming a 3D preform.

FIG. 1 shows 6 successive horizontal planes of a weave of a fibrous structure obtained by 3D weaving, wherein the weft yarn 1 is visible in section, while the warp yarn 2 is shown longitudinally.

The fibrous structure (left drawing) comprises 6 layers of weft yarns and 12 layers of warp yarns. On the right side of the figure, all the layers of warp yarn and weft yarn are bonded. On the left side, the two layers of central weft yarns are not linked together by warp yarns on 7 vertical planes of weft yarns, wherein this is referred to here as a debonding zone, referenced 3.

Fiber volume ratio: 50%.
Count of carbon yarns in warp and weft: 3K
Thickness of the structure (and preform): about 3 mm.

The warp yarns and the weft yarns are carbon yarns impregnated with polyepoxide resin, at a level of 7% of resin by weight relative to the weight of the complete structure. The structure is placed unfolded in the mold, passed through an oven to soften the resin, then cooled to give the 3D preform.

In FIG. 1, we can see the deployment of the structure, from the initial position on the left, wherein the deployment is drawn on the right side of the figure (direction of the arrow).

In the same mold or in another mold, the 3D preform will then be infiltrated or infused with a PEEK matrix to form the final part.

For this example 1, one could alternatively provide 6K yarn, depending on the desired application.

EXAMPLE 2

Figure 2:
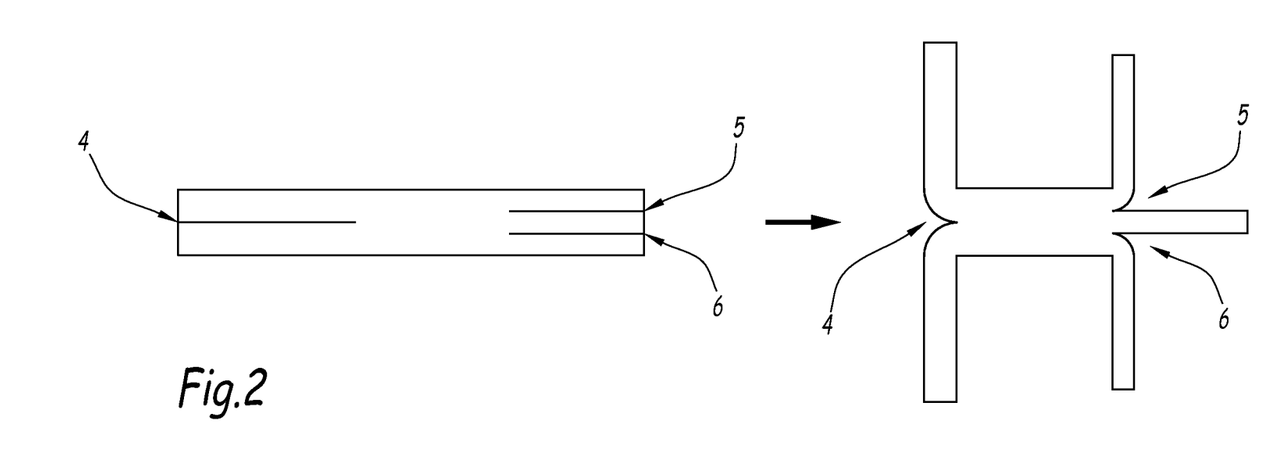
FIG. 2 shows a schematic view of the deployment of a first woven structure into a 3D preform.

On the principle of Example 1, it is possible to weave a fibrous structure according to FIG. 2 (left), comprising, on the left, a first debonding zone 4 and on the right, two debonding zones 5 and 6. This flat structure (drawing on the left) may then be deployed in the form of a 3D deployed structure comprising 5 branches (right drawing).

The warp yarns and the weft yarns are carbon yarns impregnated with polyepoxide resin, at a level of 5% of resin by weight relative to the weight of the complete structure. The structure is placed unfolded in the mold, passed through an oven to soften the resin, then cooled to give the 3D preform. In the same mold or in another mold, the 3D preform will then be infiltrated or infused with a PEEK matrix to form the final part.

EXAMPLE 3

Figure 3:
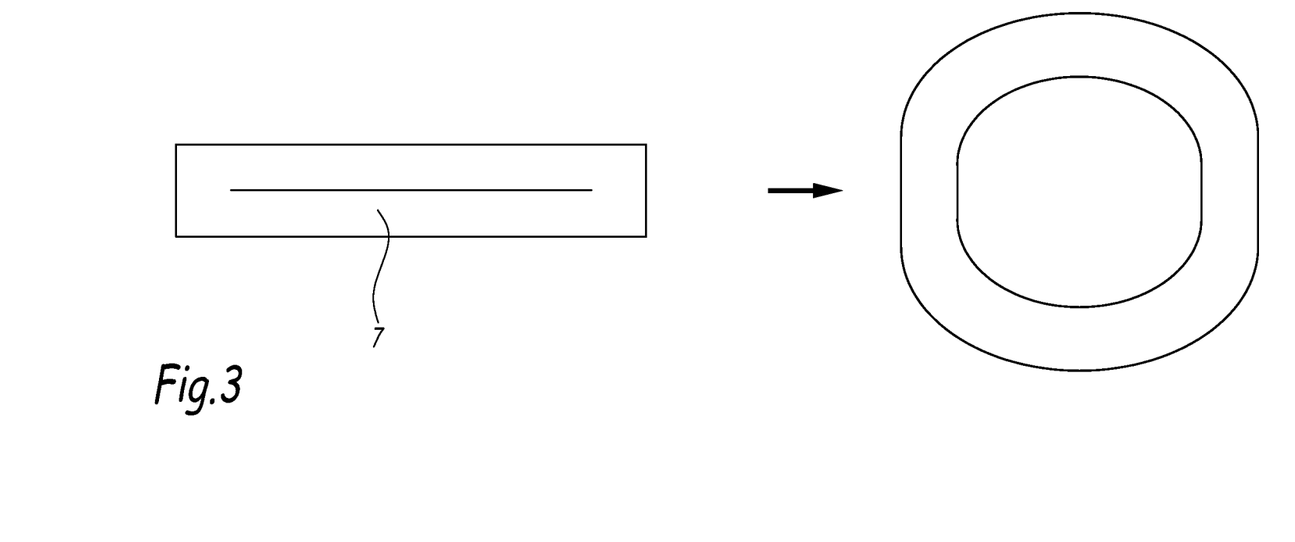
FIG. 3 shows a schematic view of the deployment of a second woven structure into a 3D preform.

On the same principle as in Example 1, it is possible to weave a fibrous structure according to FIG. 3 (left), comprising a central debonding zone 7. This flat structure (left-hand drawing) can then be deployed in the form of a hollow 3D or hollow tubular structure (right-hand drawing).

The warp yarns and the weft yarns are carbon yarns impregnated with polyamide resin, at a level of 10% by weight of resin relative to the weight of the complete structure. The structure is placed unfolded in the mold, passed through an oven to soften the resin, then cooled to give the 3D preform. In the same mold or in another mold, the 3D preform will then be infiltrated or infused with a PEEK matrix to form the final part.

We may vary the implementation of the debonding, for example by making them in warp, and combining the two types in the same structure.

EXAMPLE 4

Figure 4:
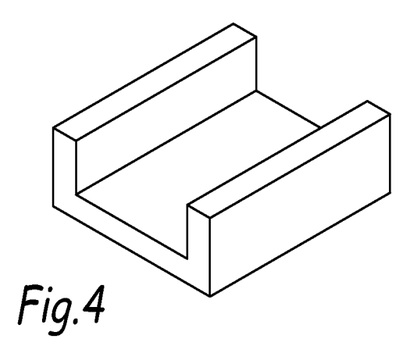
FIGS. 4 to 9 show schematic views of 6 other examples of 3D preforms according to the invention.

On the same principle as in Example 1, a flat fibrous structure may be woven. The warp yarns and the weft yarns are carbon yarns impregnated with amide block copolymer resin, at a level of 3% of resin by weight relative to the weight of the complete structure. The fibrous structure is then folded to form the shape of FIG. 4 or 5. The structure is placed in the mold deployed in an oven to soften the resin, then cooled to give the 3D preform. In the same mold or in another mold, the 3D preform will then be infiltrated or infused with a PEEK matrix to form the final part.

EXAMPLE 5

Figure 7:
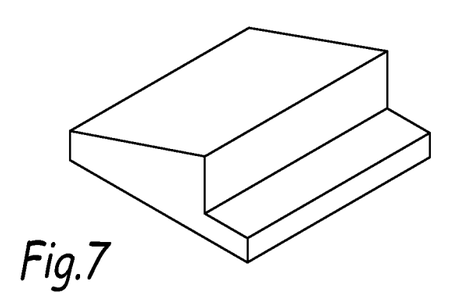

On the same principle as in Example 1, it is possible to weave a flat fibrous structure of variable thickness as shown in FIG. 7. The warp yarns and the weft yarns are glass yarns impregnated with polyepoxide resin, PEI or polyimide, at a level of 4% resin by weight relative to the weight of the complete structure. The structure is placed deployed in the mold, passed through an oven to soften the resin, then cooled to give the 3D preform. In the same mold or in another mold, the 3D preform will then be infiltrated or infused with PEEK matrix to form the final part.

EXAMPLE 6

Figure 5:
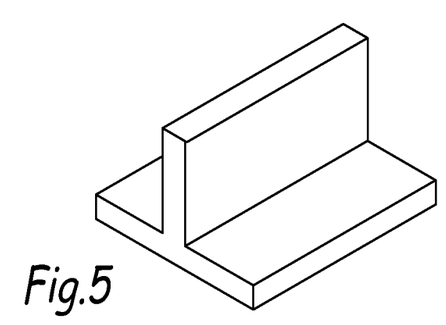
Figure 6:
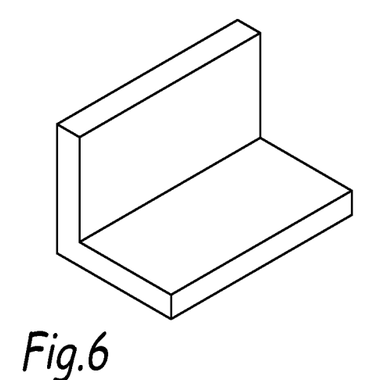
Figure 8:
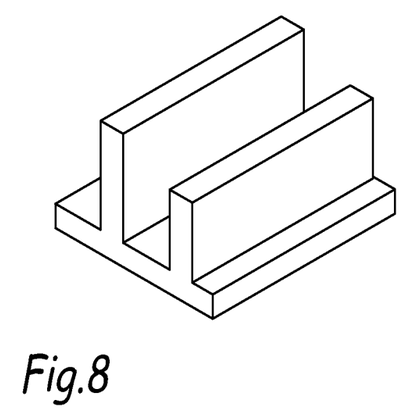
Figure 9:
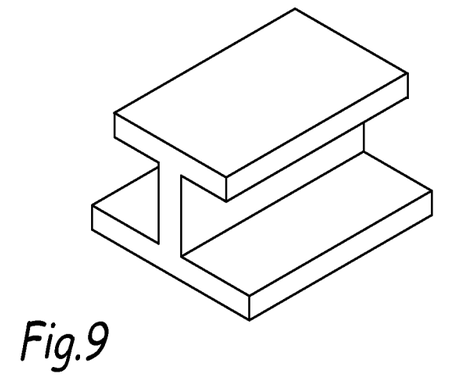

On the same principle as in Example 3, it is possible to weave a flat fibrous structure comprising one or more debonding zones 7 extending in the thickness of the fibrous structure, and making it possible, during deployment, to produce the examples in FIGS. 5, 8 and 9.

The warp yarns and the weft yarns are carbon yarns impregnated with polyepoxide resin, at a ratio in accordance with the invention. The structure is placed deployed in the mold, passed through an oven to soften the resin, then cooled to give the 3D preform. In the same mold or in another mold, the 3D preform will then be infiltrated or infused with a PEEK matrix to form the final part.

The invention claimed is:

1. A 3D fibrous structure preform comprising at least three layers of weft and/or warp yarns, wherein the structure is woven as one part by multilayer weaving between a plurality of layers of warp yarns and a plurality of layers of weft yarns with intercrossing of yarns between layers of warp yarns and layers of weft yarns, wherein the multilayer weaving is carried out using a plurality of warp yarns and/or weft yarns carrying a thermosensitive polymer on their surface, wherein the thermosensitive polymer has a softening temperature that will allow the thermosensitive polymer to undergo reversible softening, wherein said preform comprises a predetermined distribution of intersection points of warp yarn and weft yarn bonded by the thermosensitive polymer, and wherein the thermosensitive polymer represents a weight less than, or equal to, about 10% by weight based on the total weight of the preform, and wherein the preform comprises at least one thermoformed portion in which the warp and weft yarns are bonded to their intersections by the thermosensitive polymer after softening and cooling, and to at least one of the warp and/or weft yarns of the thermosensitive polymer.

2. The preform according to claim 1, wherein the polymer represents a weight from about 1 to about 7% by weight based on the total weight of the preform.

3. The preform according to claim 1, wherein the polymer represents a weight from 1 to 5% by weight based on the total weight of the preform.

4. The preform according to claim 1, wherein the fibrous structure is obtained by weaving using warp yarn and/or weft yarn carrying the thermosensitive polymer on the surface, and the transition to the preform is effected by thermoforming at a temperature above the softening point of the polymer, followed by cooling, wherein the warp and weft yarn are bonded at their intersection by the polymer through at least one of the warp and/or weft yarns bearing the polymer.

5. The preform according to claim 1, wherein the warp yarn and/or weft yarn engaged in the weave bear the polymer in at least a portion of the fibrous structure.

6. The preform according to claim 5, wherein said preform comprises at least a thermoformed portion and a non-thermoformed portion without polymer.

7. The preform according to claim 1, wherein all of the warp yarns and/or all of the weft yarns engaged in the weave bears the polymer and all of the preform is thermoformed.

8. The preform according to claim 1, wherein a plurality of warp yarns and/or weft yarns carries a polymer deposited by dusting, extrusion, impregnation, or thermal spraying.

9. The preform according to claim 1, wherein said preform comprises from 3 to 100 layers of warp yarns and/or weft yarns.

10. The preform according to claim 1, wherein said preform comprises from 3 to 50 layers of warp yarns and/or weft yarns.

11. The preform according to claim 1, wherein the yarns are carbon yarns.

12. The preform according to claim 1, wherein the polymer is a thermoplastic polymer or a thermosetting polymer.

13. The preform according to claim 12, wherein the polymer is selected from the group consisting of a Polyamide 6, a Polyamide 12, a Polyamide 6,6, a Polyamide 6,10, a Polyamide 6,12, and a mixture of at least two of them.

14. The preform according to claim 1, wherein the fibrous structure is formed by Jacquard weaving.

15. A woven 3D fibrous structure comprising at least 3 layers of weft and/or warp yarns, wherein the structure is woven as one part by multilayer weaving between a plurality of warp yarn layers and a plurality of weft yarn layers with intercrossing of yarns between layers of warp yarns and layers of weft yarns, wherein the weaving is carried out using a plurality of warp yarns and/or weft yarns carrying a thermosensitive polymer on the surface, wherein the thermosensitive polymer has a softening temperature that will allow the thermosensitive polymer to undergo reversible softening, and wherein the thermosensitive polymer represents a weight less than or equal to 10% by weight based on the total weight of the fibrous structure.

16. The woven 3D fibrous structure according to claim 15, wherein the polymer represents a weight about 1 to 7% by weight based on the total weight of the fibrous structure.

17. The woven 3D fibrous structure according to claim 15, wherein the polymer represents a weight about 1 to 5% by weight based on the total weight of the fibrous structure.

18. A method of manufacturing the preform according to claim 1, comprising producing a fibrous structure by multilayer weaving between a plurality of warp yarn layers and a plurality of weft yarn layers with intercrossing of yarns between layers of warp yarns and layers of weft yarns, wherein the multilayer weaving is carried out by using a plurality of warp yarns and/or weft yarns bearing a thermosensitive polymer on the surface, wherein the thermosensitive polymer has a softening temperature that will allow the thermosensitive polymer to undergo reversible softening, wherein the thermosensitive polymer represents a weight of less than, or equal to, about 10% by weight based on the total weight of the preform, and then the fibrous structure is heated to a temperature equal or above the softening temperature of the thermosensitive polymer, and then the temperature is lowered below this softening point of the thermosensitive polymer, and wherein the yarns are bonded together at the points of contact where the thermosensitive polymer is present.

19. The method according to claim 18, wherein the polymer represents a weight from about 1 to about 7% by weight based on the total weight of the preform.

20. The method according to claim 18, wherein the polymer represents a weight from about 1 to about 5% by weight based on the total weight of the preform.

21. A composite part comprising a preform according to claim 1.

22. The preform according to claim 12, wherein the polymer is selected from the group consisting of polyamides, copolyamides (CoPA), polyamides-block ether or ester, polyphthalamides (PPA), polyesters, copolyesters (CoPE), thermoplastic polyurethanes (TPU), polyacetals, polyolefins, polyethersulfones (PES), polysulfones, polyphenyl sulfones, polyaryletherketones, polyetherimides (PEI), thermoplastic polyimides, liquid crystal polymers (LCP), phenoxys, block copolymers, epoxies, bismaleimide, phenolic polymers, and mixtures thereof.

23. The preform according to claim 12, wherein the polymer is selected from the group consisting of polyetheretherketones (PEEK), polyetherketoneketone (PEKK), polyethylene terephthalate (PET), polybutylene terephthalate (PBT), polyphenylene sulfide (PPS), styrene-butadienemethylmethacrylate copolymers (SBM), methylmethacrylate-butyl-methylmethacrylate acrylate copolymers (MAM), and mixtures thereof.

24. The preform according to claim 1, wherein the preform comprises at least two layers of consecutive warp yarns or weft yarns that are not bonded together on a certain surface, forming a debonding zone in the plane between two layers of warp yarns or between two layers of weft yarns.

25. The woven 3D fibrous structure according to claim 15, wherein the structure comprises at least two layers of consecutive warp yarns or weft yarns that are not bonded together on a certain surface, forming a debonding zone in the plane between two layers of warp yarns or between two layers of weft yarns.

* * * * *